UNITED STATES PATENT OFFICE.

JAMES P. A. McCOY, OF WILKINSBURG, PENNSYLVANIA, ASSIGNOR TO WESTINGHOUSE ELECTRIC AND MANUFACTURING COMPANY, A CORPORATION OF PENNSYLVANIA.

CONDENSATION PRODUCT AND RELATED COMPOSITION AND PROCESS OF MAKING THE SAME.

1,286,372.  Specification of Letters Patent.  Patented Dec. 3, 1918.

No Drawing.  Application filed April 12, 1915. Serial No. 20,753.

*To all whom it may concern:*

Be it known that I, JAMES P. A. McCOY, a subject of the King of Great Britain, and a resident of Wilkinsburg, in the county of Allegheny and State of Pennsylvania, have invented a new and useful Improvement in Condensation Products and Related Compositions and Processes of Making the Same, of which the following is a specification.

My invention relates to the manufacture of condensation products and molded articles containing such products, and it has for its object to prepare phenolic condensation products which shall form suitable ingredients in molded electrical insulation and other molded compositions.

A further object of my invention is to provide new and highly efficient insulating compositions comprising the condensation products described above.

I have discovered that pyrogallol may be caused to react with certain bodies containing an active methylene groups to produce hard, insoluble condensation products. This reaction is assisted by the presence of gum arabic, and it appears that, when a mixture of gum arabic and pyrogallol undergoes oxidation, some of the benzene nuclei of the pyrogallol are split up and that condensation of the mixture results in the formation of complex naphthalene bodies. The resulting resinous condensation product is colored a deep red, which seems to indicate that a part of the pyrogallol reacts to form a purpurogallin. Whatever may be the reactions involved, a resinous product is produced which is well suited for use in making certain molded compositions, especially for electrical insulating purposes.

According to one suitable manner of carrying out the foregoing process, I mix substantially equal parts of pyrogallol and gum arabic, as is done in the preparation of the dyestuff purpurogallin, and to this mixture I add about 5% of its weight of a polymer of formaldehyde such as trioxymethylene (meta-formaldehyde) or para-formaldehyde. If this mixture is subjected to heat and pressure, it is transformed into the resinous condensation products described above, and, in its final stage of condensation, it is a deep red, lustrous mass which is hard, infusible and insoluble in ordinary solvents.

In preparing molded compositions according to a further development of my invention, I add to the mixture, prepared from the foregoing ingredients, in substantially the proportions stated, about 50% of their weight of a filler such as sawdust, wood flour or comminuted asbestos, the exact amount of which may be widely varied according to the characteristics which it is desired to impart to the resulting compositions. The mixture of condensing ingredients and filler is compressed in a hot mold, which operation serves simultaneously to shape the mass and to effect the formation of the condensation product.

Many substances other than those enumerated above may be used in practising my invention, and it is therefore to be understood that no limitations are to be imposed thereupon except such as are indicated in the appended claims.

I claim as my invention:

1. The process of making condensation products that comprises mixing pyrogallol and a substance containing an acting methylene group and subjecting the said mixture to heat and pressure.

2. The process of making condensation products that comprises mixing pyrogallol and a polymer of formaldehyde and subjecting the said mixture to heat and pressure.

3. The process of making condensation products that comprises mixing pyrogallol and trioxymethylene and subjecting the said mixture to heat and pressure.

4. The process of making condensation products that comprises mixing pyrogallol, gum arabic and a substance containing an active methylene group and subjecting the said mixture to heat and pressure.

5. The process of making condensation products that comprises mixing pyrogallol, gum arabic and a polymer of formaldehyde and subjecting the said mixture to heat and pressure.

6. The process of making condensation products that comprises mixing pyrogallol, gum arabic and trioxymethylene and subjecting the said mixture to heat and pressure.

7. The process of making condensation products that comprises mixing substantially equal parts of pyrogallol and gum arabic and a polymer of formaldehyde amounting to about 5% of the said mixture and subjecting the mixture to heat and pressure.

8. The process of making molded compositions that comprises mixing pyrogallol, gum arabic, a substance containing an active methylene group, and a filler, and subjecting the said mixture to heat and pressure.

9. The process of making molded compositions that comprises mixing pyrogallol, gum arabic, a polymer of formaldehyde and a filler, and compressing the said mixture in a hot mold.

10. The process of making molded compositions that comprises mixing substantially equal parts of pyrogallol and gum arabic, trioxymethylene, amounting to substantially 5% of the said mixture, and a filler amounting to about 50% of the said mixture, and compressing the said mixture in a hot mold.

11. A condensation product of pyrogallol and a substance containing an active methylene group.

12. A condensation product of pyrogallol and a polymer of formaldehyde.

13. A condensation product of pyrogallol and trioxymethylene.

14. A condensation product of pyrogallol, gum arabic and a substance containing an active methylene group.

15. A condensation product of pyrogallol, gum arabic and trioxymethylene.

16. A molding composition comprising a condensation product of pyrogallol and a substance containing an active methylene group.

17. A molding composition comprising a condensation product of pyrogallol and a polymer of formaldehyde.

In testimony whereof I have hereunto subscribed my name this 30th day of March, 1915.

JAMES P. A. McCOY.